United States Patent
Wu et al.

(10) Patent No.: US 11,276,534 B2
(45) Date of Patent: *Mar. 15, 2022

(54) SWITCH SEAT BODY STRUCTURE

(71) Applicants: SWITCHLAB INC., New Taipei (TW); SWITCHLAB (SHANGHAI) CO., LTD., Shanghai (CN); GAOCHENG ELECTRONICS CO., LTD., Shenzhen (CN)

(72) Inventors: Chih-Yuan Wu, New Taipei (TW); Chih-Hao Sung, New Taipei (TW); Chih-Kai Hsu, New Taipei (TW)

(73) Assignees: Switchlab Inc., New Taipei (TW); Switchlab (Shanghai) Co., Ltd., Shanghai (CN); Gaocheng Electronics Co., Ltd., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,496

(22) Filed: Mar. 12, 2020

(65) Prior Publication Data

US 2020/0294736 A1    Sep. 17, 2020

(30) Foreign Application Priority Data

Mar. 14, 2019  (TW) .................................. 108108689

(51) Int. Cl.
*H01H 13/04* (2006.01)
*H01H 13/02* (2006.01)

(52) U.S. Cl.
CPC .......... *H01H 13/04* (2013.01); *H01H 13/023* (2013.01)

(58) Field of Classification Search
CPC .......... H01H 9/02; H01H 13/04; H01H 13/14; H01H 9/0264; H01H 9/0271; H01H 13/023
See application file for complete search history.

(56) References Cited

U.S. PATENT DOCUMENTS

2015/0213970 A1* 7/2015 Wu .................. H01H 11/00
                                                           200/293
2020/0295542 A1* 9/2020 Wu .................. H01H 9/02

* cited by examiner

*Primary Examiner* — Ahmed M Saeed
(74) *Attorney, Agent, or Firm* — Rosenberg, Klein & Lee

(57) ABSTRACT

A switch seat body structure includes a main body for assembling with a switch component. The main body is composed of a metal head section in the form of a thin sheet structure and a nonmetal belly section. The main body is defined with an axis. The metal head section has a first wall normal to or inclined from the axis and a second wall connected with the first wall and parallel to or inclined from the axis. The first and second walls together define a space. The nonmetal belly section fills the space to connect with entire sections of the first and second walls as an integrated body. The switch seat body assembling structure improves the problems that the processing and manufacturing processes are time-consuming and troublesome and the material cost is higher.

42 Claims, 11 Drawing Sheets

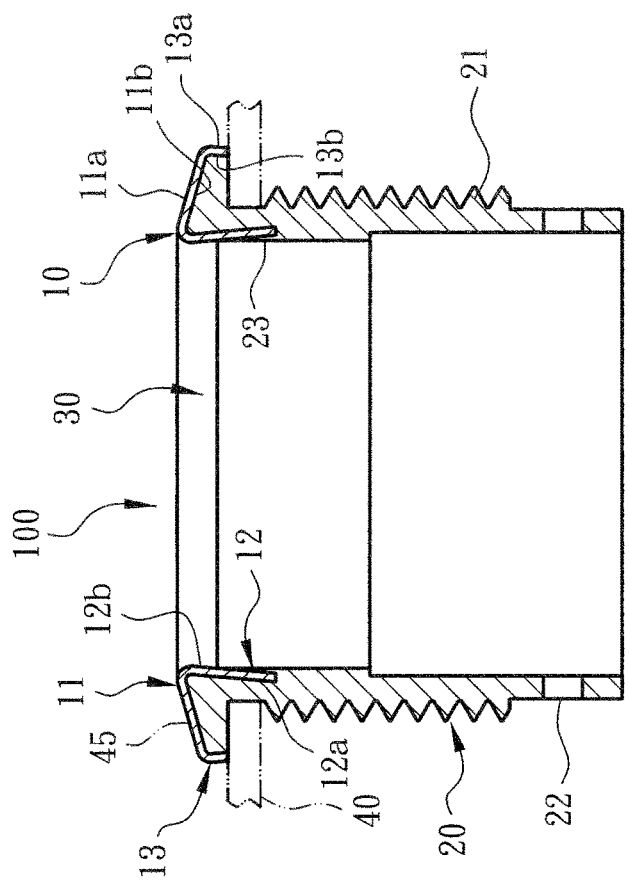
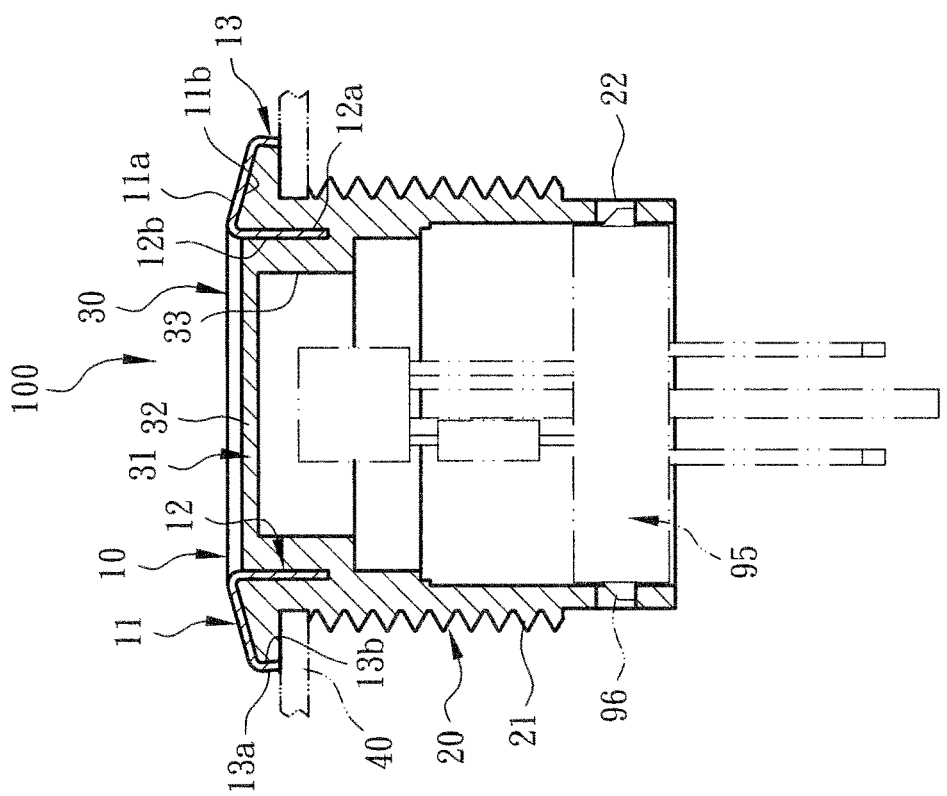
Fig. 7
Fig. 6

SWITCH SEAT BODY STRUCTURE

BACKGROUND OF THE INVENTION

1. Field of the Invention

The present invention relates generally to a switch seat body structure, and more particularly to a switch seat body structure including a complex switch seat main body composed of a metal head section in the form of a thin sheet structure and a nonmetal belly section. The nonmetal belly section is connected with the metal head section as an integrated body.

2. Description of the Related Art

A conventional switch or switch indication device is applied to an electrical, electronic or automatic control system for an operator to know the working or power-on/off state of the machine. Such switch device includes a seat body or main body, internal switch components and multiple sets of terminal pins arranged in a chamber defined by the seat body. The terminal pins extend out of the chamber or the seat body to connect with electrical conductive wire or insert on a circuit board to achieve electrical connection. A light source is disposed in the chamber of the seat body and electrically connected with a set of positive/negative electrode contact pins of the terminal pins. A slightly transparent maintenance or pushbutton switch is mounted on an upper section of the chamber of the seat body, whereby an operator can know the working or power-on/off state of the machine through the maintenance or pushbutton switch, which makes the light source emit light or not emit light.

With respect to the manufacturing and structural design of this sort of switch device, the conventional switch seat body or main body is entirely made of metal material as a cylindrical body with an internal chamber. The outer surface of the seat body is partially lathed/milled and processed to form a thread. After the internal switch components are assembled in the internal chamber of the seat body, the seat body is pressurized and forcedly deformed so as to secure the seat body with the internal switch components to form the switch device.

As well known by those who are skilled in this field, the manufacturing, assembling, processing and securing operation of the seat body of the above embodiment are more troublesome and time-consuming. As a result, the manufacturing cost is increased.

Still with respect to the structural design and operation application of the seat body of the switch device, the seat body is selectively made of metal material because when the seat body of the switch device is mounted on the panel or substrate for an operator to operate, the seat body can have sufficient structural hardness to resist against the outward destroying force created in operation. For example, the substrate applies reaction force to the seat body to cause wear and damage of the surface structure of the seat body and make the seat body loosen from the substrate. This is not what we expect.

An improved conventional switch seat body structure has been disclosed, which employs a metal head section and a nonmetal belly section connected with the head section to improve the problem that the operation is troublesome and time-consuming and provide sufficient structural hardness to resist against the outward destroying force created in operation.

The embodiment includes a main body for assembling with the internal switch components. The main body is composed of a metal head section and a nonmetal belly section. The metal head section has a shoulder section and a skirt section connected with the shoulder section (and/or the skirt section is formed with a recessed section and a subsidiary shoulder section). The shoulder section and the skirt section together define a shaft hole. The shoulder section protrudes toward outer side of the metal head section and the skirt section axially extends toward the nonmetal belly section. In addition, in cooperation with a molding module, the nonmetal belly section material is filled in to connect with at least a part of the skirt section (and/or recessed section and subsidiary shoulder section). Accordingly, the nonmetal belly section and the metal head section are integrally connected.

With respect to the structure and manufacturing of the above embodiment, the metal head section must be made from an entire metal column body by means of lathing/milling the metal column body into a cylindrical body structure. In cooperation with a miller and/or a drilling machine, most of the material of the metal cylindrical body structure is removed to manufacture the shaft hole form for mounting the switch (pushbutton).

It should be noted that the main body structure and manufacturing process of the above embodiment need to be further improved so as to shorten the manufacturing time and solve the problems that the manufacturing process is troublesome, a great amount of waste metal material is produced to affect the cost and the environment is contaminated. In this case, the switch industry can be upgraded.

To speak representatively, the above references reveal some shortcomings of the seat body or the main body and the relevant connection components of the conventional switch device in use and structural design. In case the structures and the application conditions of the seat body or the main body and the relevant components are redesigned to be different from the conventional switch device, the use form of the switch device can be changed to be different from the conventional switch device.

For example, in the condition that the seat body or the main body is manufactured to have sufficient structural hardness or strength to resist against the outward destroying force (or external action force) so as to reduce the wear and damage of the surface structure of the seat body, in comparison with the conventional switch device, the present invention can improve or eliminate the shortcoming of the conventional switch device that the metal head section must be made by means of lathing/milling to form the shaft hole. In this case, the problems of the conventional switch device that the manufacturing process is time-consuming and troublesome, a great amount of waste metal material is produced and the cost is higher are solved. Furthermore, the manufacturing process of the seat body (or the main body) is simplified to form multiple structural forms (and/or figures or characters with decoration/indication effect). Therefore, in accordance with the actual use situation, an operator can selectively use different main body structure with different structural form to widen the application range of the switch device. All the above issues are not substantially taught, suggested or disclosed in the above references.

SUMMARY OF THE INVENTION

It is therefore a primary object of the present invention to provide a switch seat body structure including a main body for assembling with a switch component. The main body is composed of a metal head section in the form of a thin sheet structure and a nonmetal belly section. The main body is defined with an axis. The metal head section has a first wall normal to or inclined from the axis and a second wall connected with one end of the first wall and parallel to or inclined from the axis. The first and second walls together define a space therebetween. The nonmetal belly section fills the space to connect with entire sections of the first and second walls as an integrated body. In condition that the switch seat body can resist against the outward destroying force and the manufacturing process is simplified, the shortcomings of the conventional switch device that the processing and manufacturing operation is time-consuming and troublesome the material cost is higher are improved.

In the above switch seat body structure, the first and second walls of the metal head section (or the main body) contain an angle, which is an acute angle, a right angle or an obtuse angle. The first and second walls together define at least one shaft hole positioned on the axis. The shaft hole has a geometrical configuration. The second wall is formed with multiple assembling sections. The assembling sections have the form of protruding plate body structure or hole structure for enhancing the connection effect between the second wall and the nonmetal belly section.

The present invention can be best understood through the following description and accompanying drawings, wherein:

BRIEF DESCRIPTION OF THE DRAWINGS

FIG. 6 is a plane sectional view of a preferred embodiment of the present invention, in which the phantom lines show that the main body is assembled with a light source component (such as an LED component);

FIG. 7 is a plane sectional view of a modified embodiment of the present invention, showing that the second wall of the main body extends to outer side of the main body in a direction inclined from the axis, whereby the first and second walls contain therebetween an acute angle;

DETAILED DESCRIPTION OF THE PREFERRED EMBODIMENTS

Figure 1:
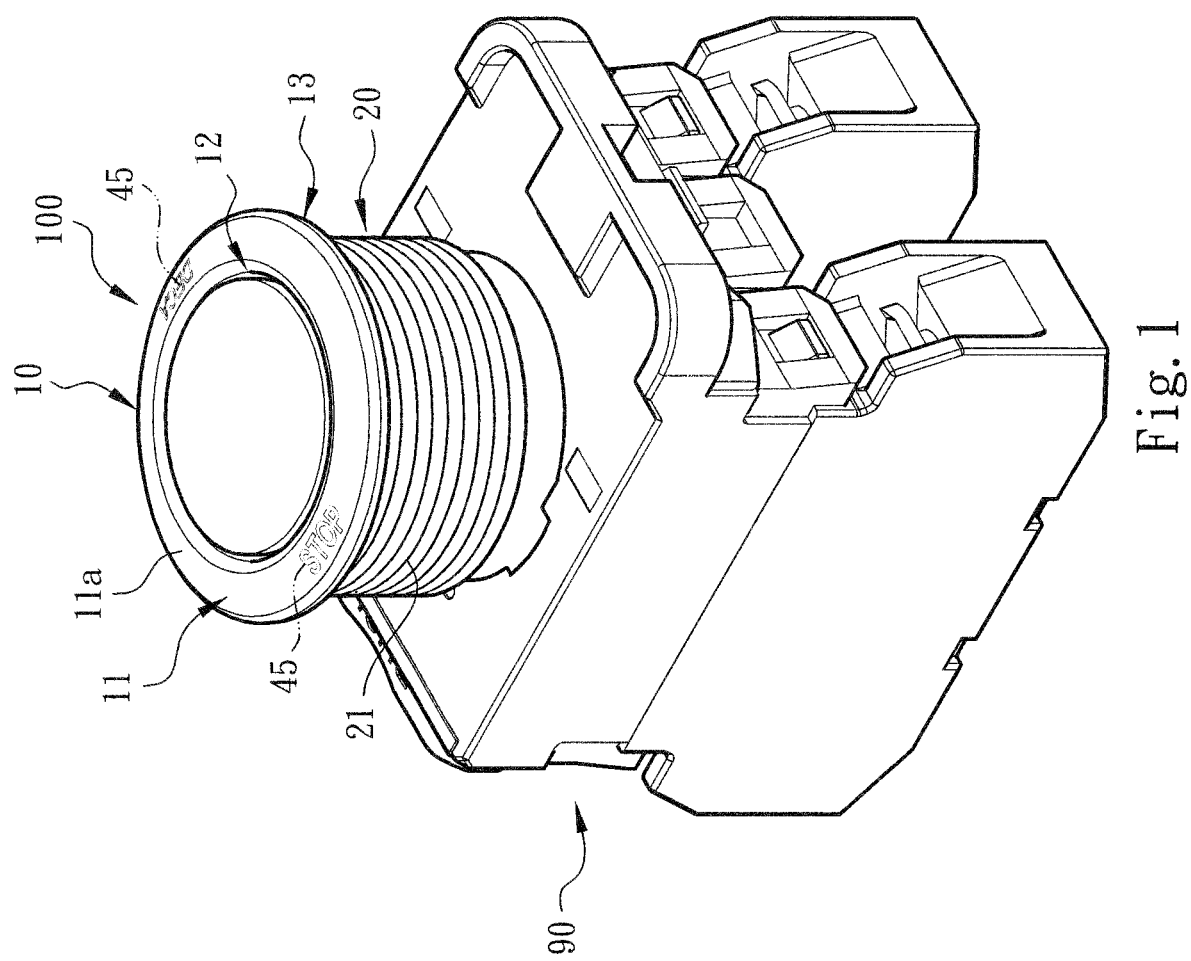
FIG. 1 is a perspective view showing that the main body of the present invention is assembled with a switch component (or wire connection terminal)
Figure 3:
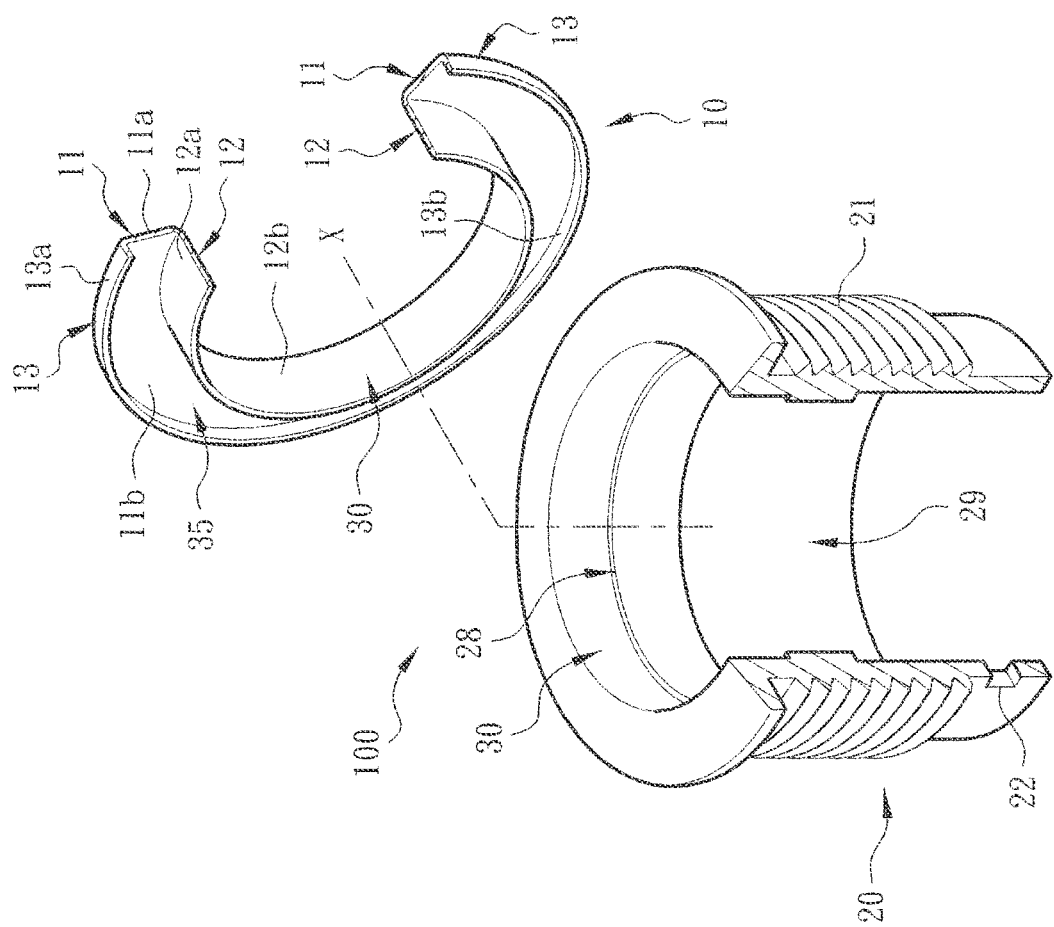
FIG. 3 is a perspective exploded view according to FIG. 2, showing the structures of the metal head section and the nonmetal belly section of the main body.
Figure 2:
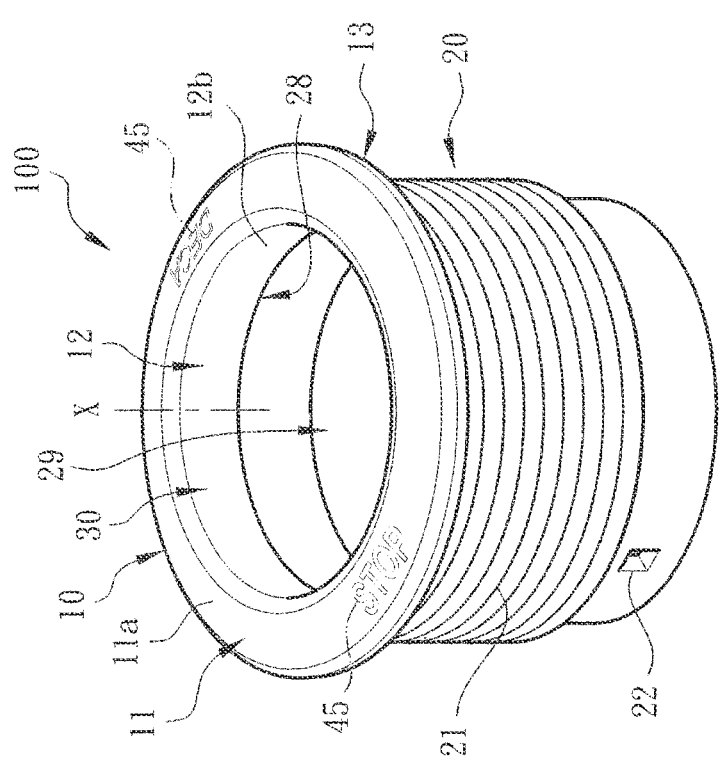
FIG. 2 is a perspective view of the main body of the present invention.

Please refer to FIGS. 1, 2 and 3. The switch seat body structure of the present invention includes a switch seat main body 100 for assembling with a switch component 90 (or wire connection terminal) to forma switch device or switch assembly. In a preferred embodiment, the main body 100 is composed of a metal head section 10 in the form of a thin sheet structure and a nonmetal belly section 20. The main body 100 is defined with an axis x.

In the description hereinafter, the upper section, upper side, lower section, lower side, outer section, outer side, inner section, inner side, etc. mentioned are recited with the direction of the drawings as the reference direction.

In a preferred embodiment, the metal head section 10 is made from a metal thin sheet by means of directly pressing the metal thin sheet. The metal head section 10 has a first wall 11 normal to (or inclined from) the axis x and a second wall 12 connected with one end of the first wall 11 in parallel to (or inclined from) the axis x to together define a shaft hole 30 positioned on the axis x. The first wall 11 and the second wall 12 of the metal head section 10 (or the main body 100) contain an angle. The angle is an acute angle, a right angle or an obtuse angle.

In a preferred embodiment, the other end of the first wall 11 is selectively formed and connected with a subsidiary wall 13. The subsidiary wall 13 is formed in such a manner that the other end of the first wall 11 is bent toward the lower side of the drawing to extend in a direction in parallel to the axis x. In addition, the first wall 11, the second wall 12 and the subsidiary wall 13 (in accordance with the direction shown in the drawing) are respectively defined with outer surfaces 11*a*, 12*a*, 13*a* and inner surfaces 11*b*, 12*b*, 13*b*.

The phantom lines of FIGS. 1 and 2 show that a plane (or solid or hollow) figure (or character) section 45 can be arranged or printed or stamped on the first wall 11 of the metal head section 10 to achieve decoration and/or indication effect.

FIG. 3 especially shows that the first wall 11 or the inner surface lib of the first wall (and the subsidiary wall 13 or the inner surface 13*b* of the subsidiary wall) and the second wall 12 or the outer surface 12*a* of the second wall together define a space 35. The nonmetal belly section 20 is made of plastic or the like material by means of the molding module to fill in the space 35 and entirely connect with the first wall 11 (or the inner surface lib of the first wall) and the second wall 12 (or the outer surface 12*a* of the second wall) and/or the subsidiary wall 13 (or the inner surface 13*b* of the subsidiary wall). The nonmetal belly section 20 extends toward the lower side of the drawing in a direction in parallel to the axis x so as to integrally connect with the metal head section 10. In this case, the structure of the metal head section 10 and the structure of the nonmetal belly section 20 can reinforce each other as shown in FIG. 4 (or FIGS. 19 and 21).

As shown in the drawings, the nonmetal belly section 20 is a column-shaped body structure with a thread 21 on the surface. The nonmetal belly section 20 defines an internal space 29 in cooperation with the shaft hole 30 of the metal head section 10 for assembling with the switch component 90. In addition, a shoulder section 28 is disposed in the internal space 29 of the nonmetal belly section 20 for regulating the assembling position of the metal head section 10 and the nonmetal belly section 20 to help in locating the metal head section 10.

Figure 4:
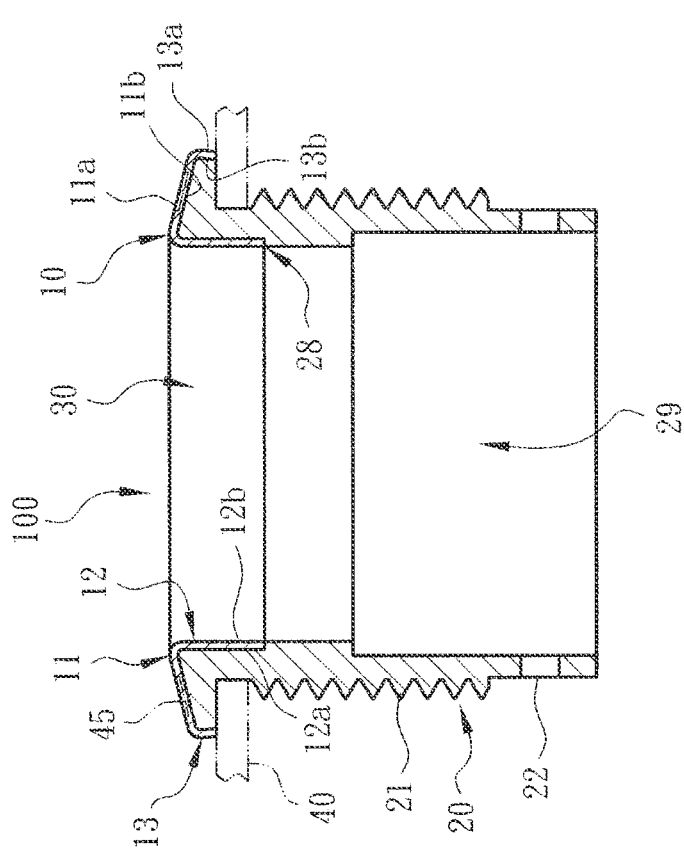
FIG. 4 is a plane sectional view of the present invention, showing that the metal head section and the nonmetal belly section of the main body are connected with each other, in which the phantom lines show that the main body is assembled with the substrate.

The phantom lines of FIG. 4 show the assembly of the main body 100 and the substrate 40. When the main body 100 and the substrate 40 are assembled for an operator to operate and use, the nonmetal belly section 20 cooperates with the subsidiary wall 13 of the metal head section 10 to press and connect with the substrate 40 to achieve a secure assembling effect. Accordingly, the switch seat body (or the main body 100) can resist against the outward destroying force. Therefore, in condition that the manufacturing process is simplified, the shortcomings of the conventional switch device that the processing and manufacturing operation is time-consuming and troublesome the material cost is higher can be improved.

Figure 5:
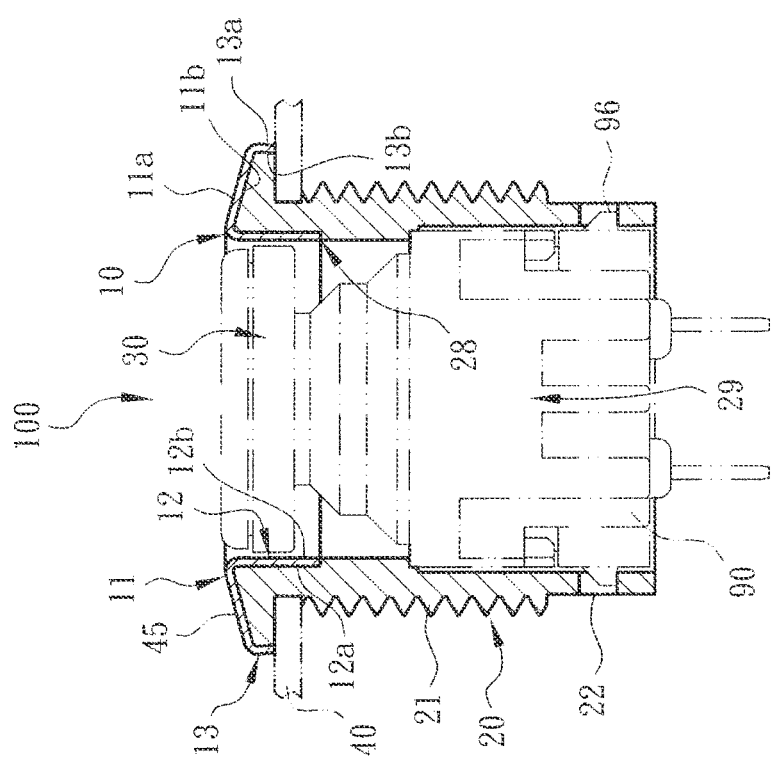
FIG. 5 is a plane sectional view of the present invention, in which the phantom lines show that the main body is assembled with another structural form of switch component.

The phantom lines of FIG. 5 also show that another structural form of switch component 90 is assembled in the main body 100.

Please now refer to FIG. 6. A light source component 95 (such as LED component) is mounted in the main body 100 or the internal space 29 of the nonmetal belly section 20 as shown by the phantom lines of the drawing.

In a preferred embodiment, the nonmetal belly section 20 of the main body 100 is formed with a restriction section 22 in the form of a hole structure (or protrusion structure). The light source component 95 (or the switch component 90) has an insertion section 96 in the form of a protrusion structure (or hole structure). The restriction section 22 is correspondingly assembled with the insertion section 96, whereby the light source component 95 (or the switch component 90) is securely assembled in the main body 100. In addition, a closure body 31 is disposed in the shaft hole 30 of the metal head section 10. The closure body 31 is selectively made of plastic material or the like material to form a structure with a U-shaped cross section. Basically, the closure body 31 can be alternatively integrally formed with the nonmetal belly section 20.

As shown in the drawing, the closure body 31 includes a base section 32 on the upper side and a wall section 33 perpendicularly connected with the base section 32. The wall section 33 cooperates with the nonmetal belly section 20 to respectively compress the inner surface 12*b* and outer surface 12*a* of the second wall 12 of the metal head section, whereby the nonmetal belly section 20 encloses the second wall 12 to achieve securer connection effect.

In a preferred embodiment, the base section 32 and/or wall section 33 of the closure body 31 can be transparent so that the light source component 95 (in cooperation with the hollow figure section 45) can emit light through the closure body 31 to achieve more special decoration and/or indication effect.

FIG. 7 shows a modified embodiment of the present invention, in which the second wall 12 of the main body 100 or the metal head section extends to outer side (or inner side) of the main body 100 in a direction inclined from the axis x, whereby the first wall 11 and the second wall 12 contain an acute angle (or an obtuse angle). In the structural form that the second wall 12 obliquely extends to outer side of the main body 100, a section 23 of the nonmetal belly section 20 cooperates with the nonmetal belly section 20 to respectively compress the inner surface 12*b* and outer surface 12*a* of the second wall 12 of the metal head section. Accordingly, the nonmetal belly section 20 encloses at least a part of the second wall 12 to achieve secure connection effect.

Figure 8:
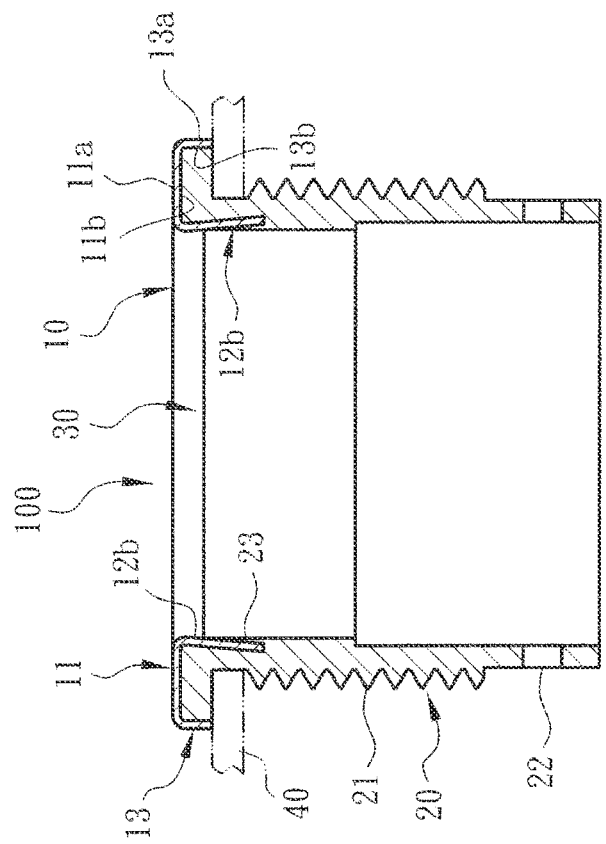
FIG. 8 is a plane sectional view of a preferred embodiment of the present invention, showing that the other end of the first wall of the main body is bent toward the lower side of the drawing to extend in a direction parallel to the axis and form the subsidiary wall.

Please refer to FIG. 8, which shows that the first wall 11 of the metal head section or the main body 100 is normal to the axis x and the other end of the first wall 11 is bent toward the lower side of the drawing to extend in a direction parallel to the axis x to form a subsidiary wall 13.

Figure 9:
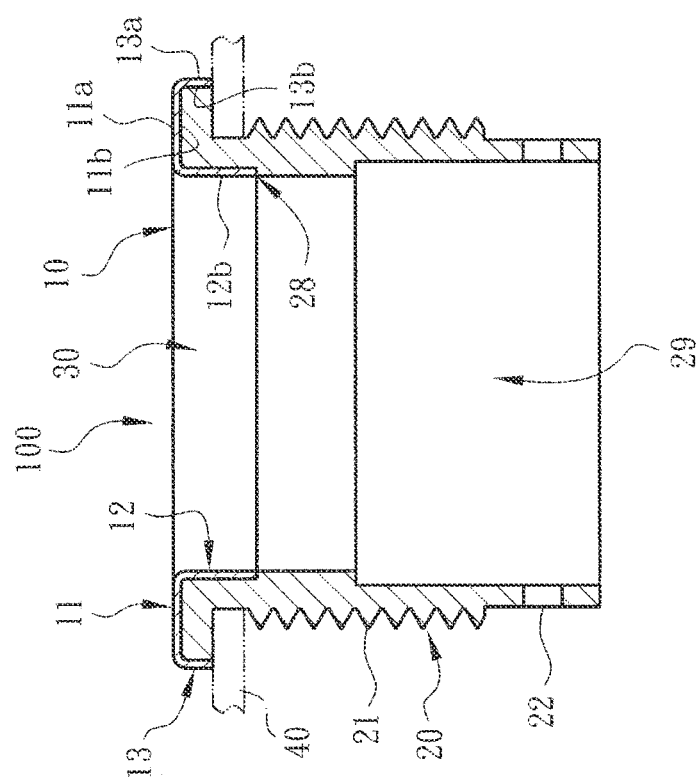
FIG. 9 is a sectional view of a modified embodiment of the present invention according to FIG. 8, showing that the second wall of the main body extends to outer side of the main body in a direction inclined from the axis, whereby the first and second walls contain therebetween an acute angle.

FIG. 9 is a sectional view of a modified embodiment of the present invention according to FIG. 8, showing that the second wall 12 of the metal head section or the main body 100 extends to outer side (or inner side) of the main body 100 in a direction inclined from the axis x, whereby the first and second walls 11, 12 contain therebetween an acute angle (or an obtuse angle). The second wall 12 obliquely extends to the outer side of the main body 100, whereby a section 23 of the nonmetal belly section 20 cooperates with the nonmetal belly section 20 to respectively compress the inner surface 12*b* and outer surface 12*a* of the second wall 12 of the metal head section. Accordingly, the nonmetal belly section 20 encloses the second wall 12.

Figure 10:
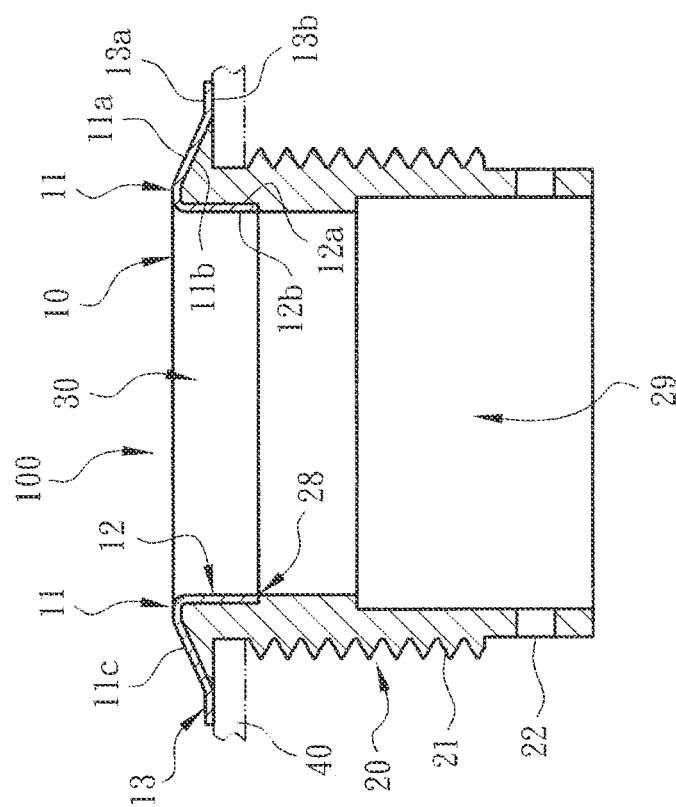
FIG. 10 is a plane sectional view of a preferred embodiment of the present invention, showing that the first wall of the main body extends in a direction inclined from the axis, whereby the other end of the first wall extends in a direction normal to the axis to form the subsidiary wall.

Please now refer to FIG. 10, which shows that the first wall 11 of the metal head section or the main body 100 extends in a direction inclined from the axis x and has an inclined section 11c. The other end of the first wall 11 (or the inclined section 11c) extends in a direction normal to the axis x to form the subsidiary wall 13, whereby the subsidiary wall 13 can (totally) press the substrate 40.

Figure 11:
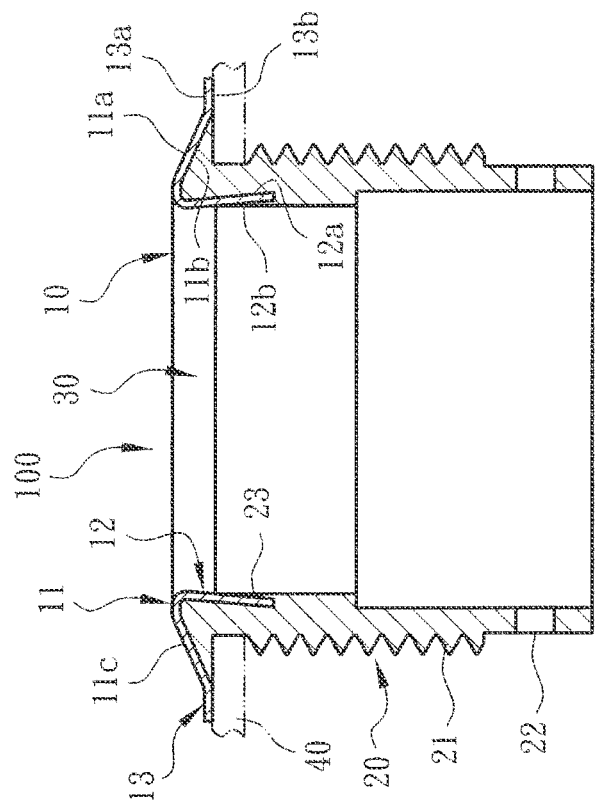
FIG. 11 is a sectional view of a modified embodiment of the present invention according to FIG. 10, showing that the second wall of the main body extends to outer side of the main body in a direction inclined from the axis, whereby the first and second walls contain therebetween an acute angle.

FIG. 11 is a view of a modified embodiment according to FIG. 10, showing that the second wall 12 of the metal head section or the main body 100 extends to outer side (or inner side) of the main body 100 in a direction inclined from the axis x, whereby the first and second walls 11, 12 contain therebetween an acute angle (or an obtuse angle). The second wall 12 obliquely extends to the outer side of the main body 100, whereby a section 23 of the nonmetal belly section 20 cooperates with the nonmetal belly section 20 to respectively compress the inner surface 12b and outer surface 12a of the second wall 12 of the metal head section. Accordingly, the nonmetal belly section 20 encloses the second wall 12.

Figure 12:
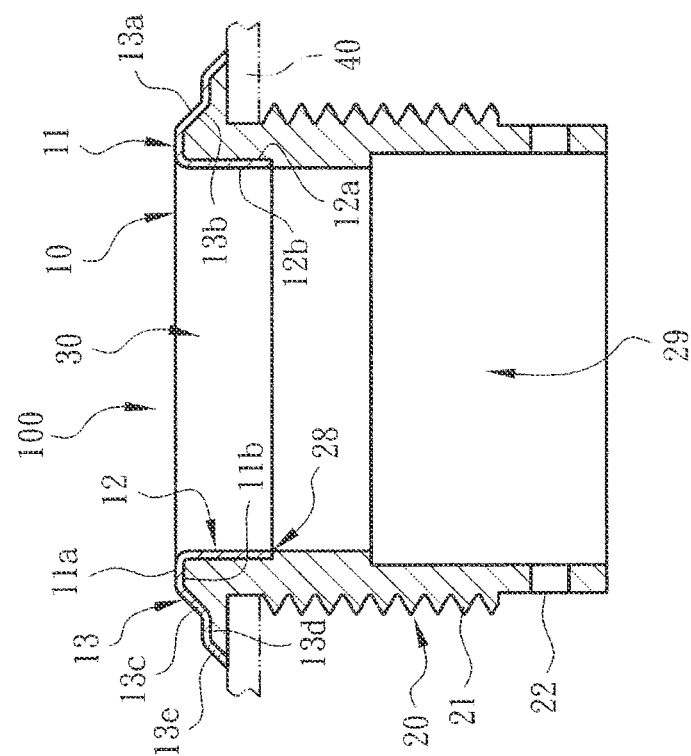
FIG. 12 is a plane sectional view of a modified embodiment of the present invention, showing that the first wall of the main body extends in a direction normal to the axis, whereby the other end of the first wall extends to outer side of the main body to form the subsidiary wall inclined from the axis and the tail end of the subsidiary wall extends to outer side of the main body in a direction normal to the axis to form a connection section and the connection section further extends to outer side of the main body in a direction inclined from the axis to form a tail section.

Please now refer to FIG. 12, which shows that the first wall 11 of the metal head section or the main body 100 extends in a direction normal to the axis x and the other end of the first wall 11 extends to the outer side of the main body 100 to form the subsidiary wall 13 inclined from the axis x to have an (inclined) head section 13c. The tail end of the subsidiary wall 13 (or the head section 13c) extends to outer side of the main body 100 in a direction normal to the axis x to form a connection section 13d. The connection section 13d further extends to the outer side of the main body 100 in a direction inclined from the axis x to form a tail section 13e. Accordingly, the metal head section 10 (or the first wall 11 and the subsidiary wall 13) has a structural form of at least two-stage structure or high-and-low stage structure. This makes the metal head section 10 have better elasticity in response to the action force created when an operator operates the switch device (or the reaction force applied to the main body 100 by the substrate 40).

In this embodiment, the angle contained between the first wall 11 and the head section 13c of the subsidiary wall is an acute angle, a right angle or an obtuse angle. The angle contained between the head section 13c of the subsidiary wall and the connection section 13d is an acute angle, a right angle or an obtuse angle. The angle contained between the connection section 13d and the tail section 13e is an acute angle, a right angle or an obtuse angle.

Figure 13:
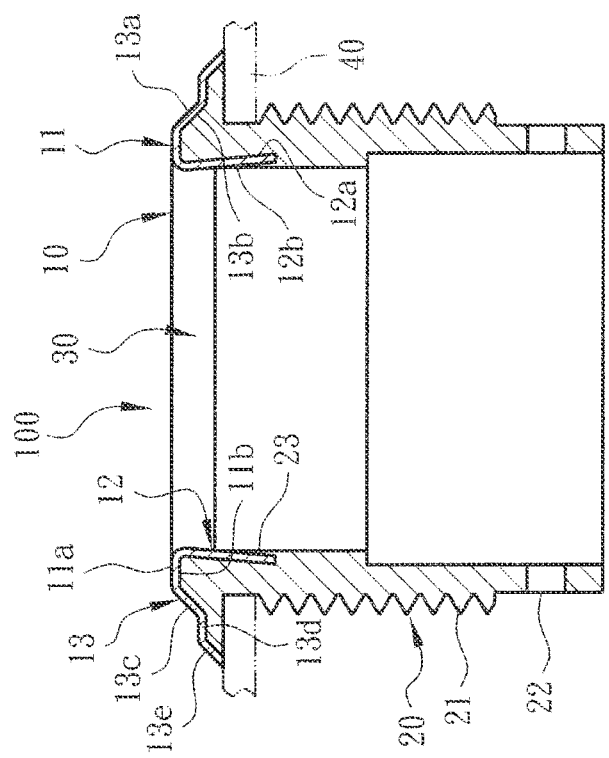
FIG. 13 is a sectional view of a modified embodiment of the present invention according to FIG. 12, showing that the second wall of the main body extends to outer side of the main body in a direction inclined from the axis, whereby the first and second walls contain therebetween an acute angle.

FIG. 13 is a view of a modified embodiment according to FIG. 12, showing that the second wall 12 of the metal head section or the main body 100 extends to outer side of the main body 100 in a direction inclined from the axis x, whereby the first wall 11 and the second wall 12 contain an acute angle. The second wall 12 obliquely extends to the outer side of the main body 100, whereby a section 23 of the nonmetal belly section 20 cooperates with the nonmetal belly section 20 to respectively compress the inner surface 12b and outer surface 12a of the second wall 12 of the metal head section. Accordingly, the nonmetal belly section 20 encloses the second wall 12.

Figure 14:
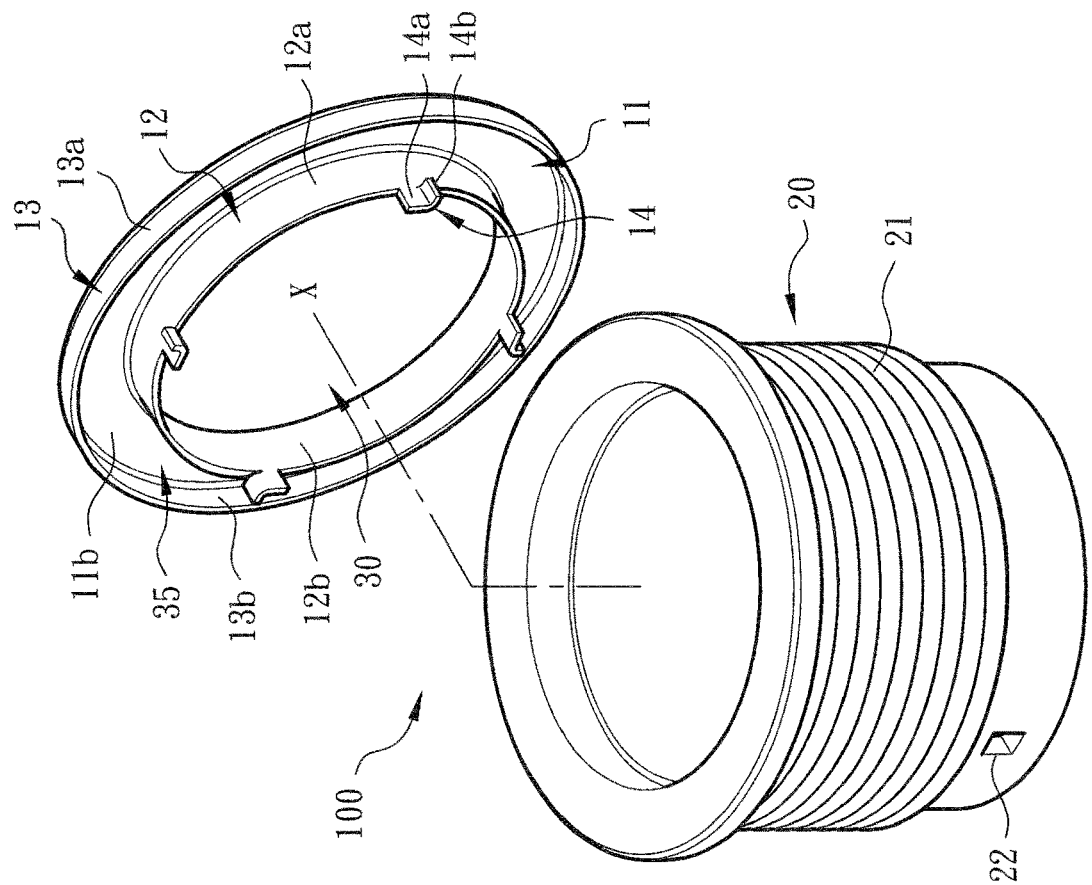
FIG. 14 is a perspective exploded view of a preferred embodiment of the present invention, showing that the second wall of the metal head section of the main body is formed with assembling sections.
Figure 17:
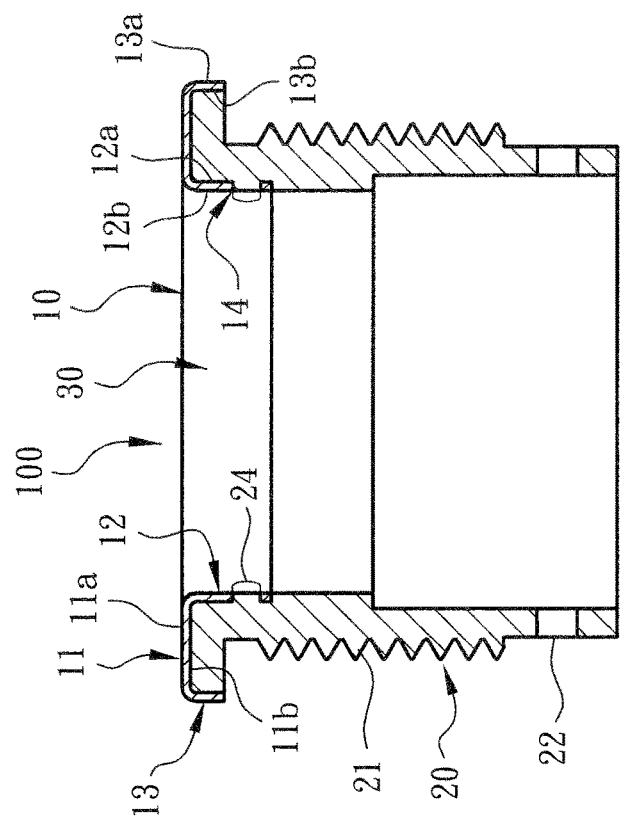
FIG. 17 is a plane sectional view according to FIG. 16, showing that the nonmetal belly section and the insertion sections are connected with the metal head section and the assembling sections.

Please refer to FIG. 14, which shows that the second wall 12 of the metal head section 10 or the main body 100 is formed with at least one assembling section 14. In this embodiment, multiple assembling sections 14 integrally protrude from the lower section of the second wall 12 in a direction in parallel to the axis x. Each assembling section 14 includes a base section 14a coplanar with the second wall 12 (or the outer surface 12a of the second wall) and a subsidiary section 14b perpendicularly bent from the base section 14a to protrude in a direction to outer side of the main body 100, whereby the assembling section 14 has the form of an L-shaped plate body structure.

Figure 15:
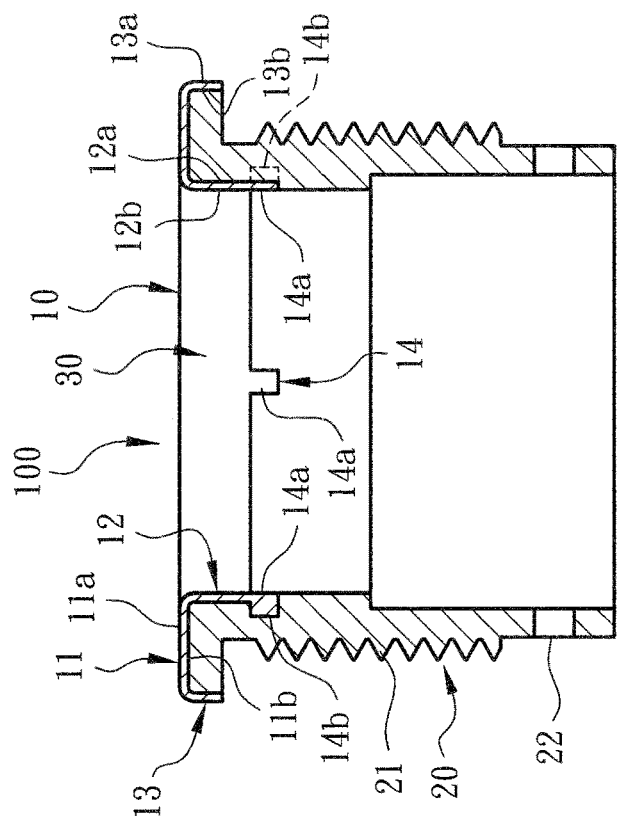
FIG. 15 is a plane sectional view according to FIG. 14, showing that the nonmetal belly section is assembled with the metal head section and the assembling sections.

FIG. 15 shows that the assembling section 14 has the form of an L-shaped plate body structure. When the nonmetal belly section 20 is connected with the metal head section 10, the structures of the assembling sections 14 serve to prevent the metal head section 10 from easily detaching from the nonmetal belly section 20 so as to achieve a secure connection effect.

Figure 16:
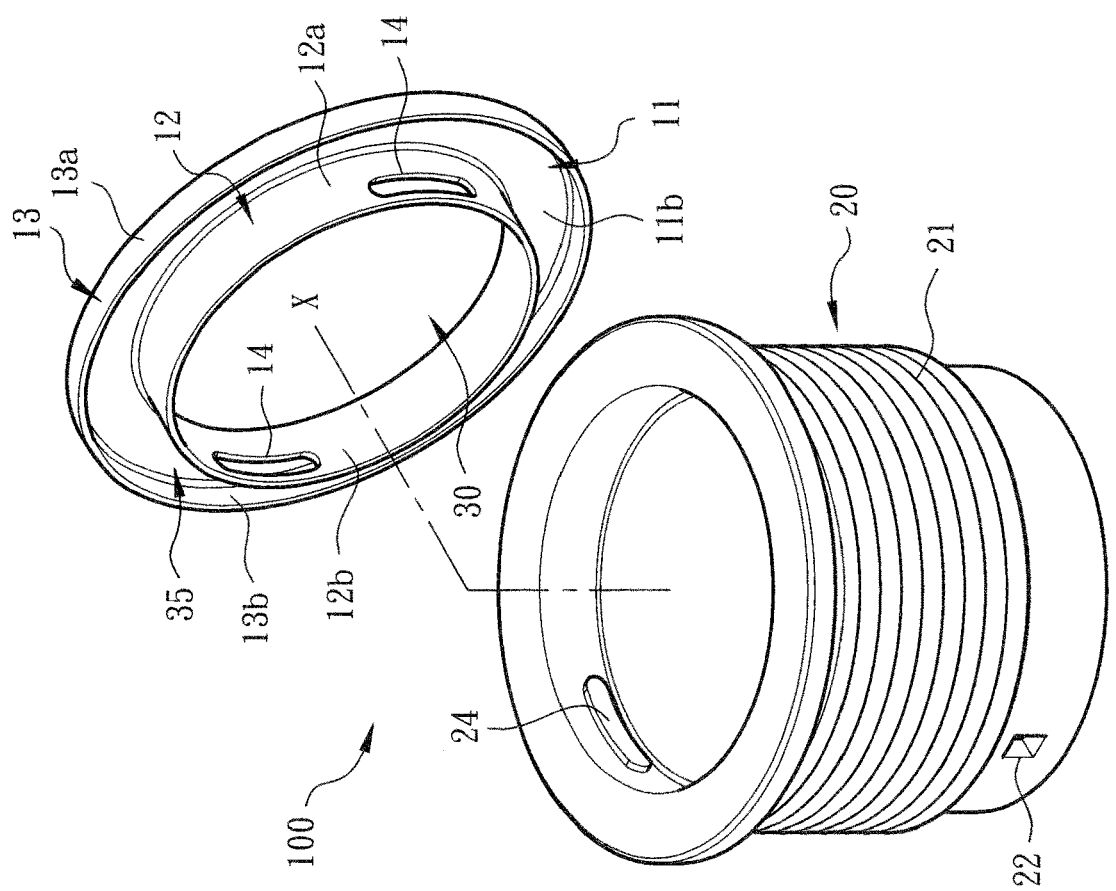
FIG. 16 is a perspective exploded view of a modified embodiment of the present invention, showing that the second wall of the metal head section of the main body is formed with assembling sections and the nonmetal belly section is formed with insertion sections.

Please refer to FIG. 16, which shows that at least one assembling section 14 is disposed on the second wall 12 of the metal head section 10 or the main body 100. The nonmetal belly section 20 is formed with at least one insertion section 24. In this embodiment, the assembling sections 14 have the form of hole structures (or protrusion structures). The insertion section 24 of the nonmetal belly section 20 protrudes to the axis x (or the inner side of the main body 100) (or is recessed in a direction away from the axis x or to the outer side of the main body 100). When the nonmetal belly section 20 is assembled with the metal head section 10, the nonmetal belly section 20 is plugged into the assembling sections 14 and the insertion sections 24 are inserted with the assembling sections 14. In this case, the metal head section 10 is uneasy to detach from the nonmetal belly section 20 and a secure connection effect is achieved.

Figure 18:
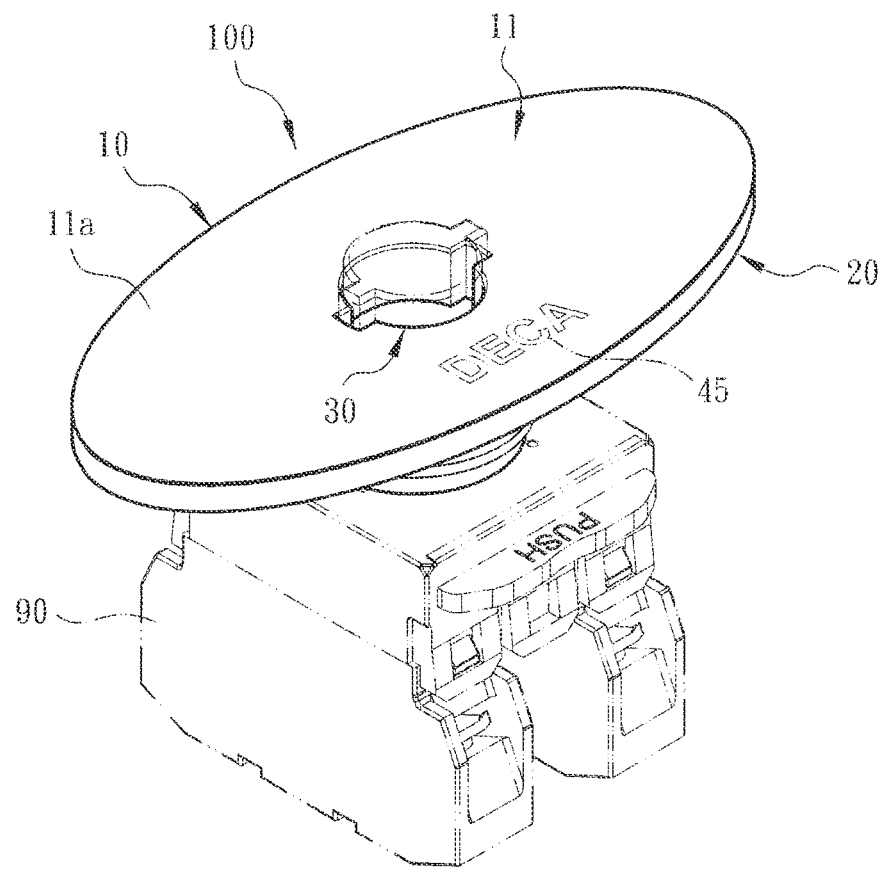
FIG. 18 is a perspective view of a preferred embodiment of the present invention, in which the phantom lines show that the main body is assembled with the switch component (or wire connection terminal)
Figure 19:
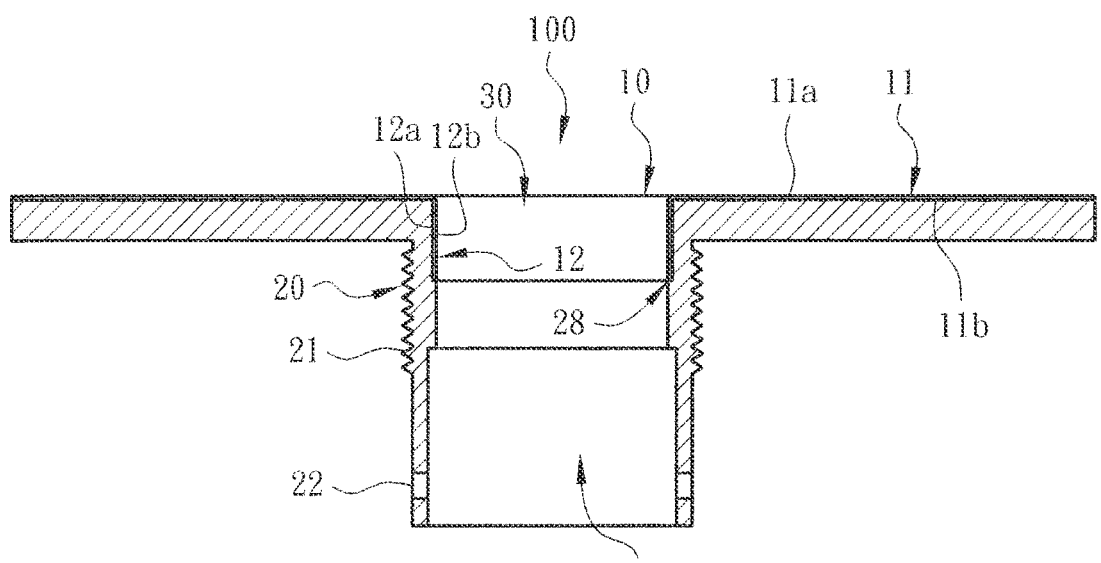
FIG. 19 is a sectional view according to FIG. 18, showing that the metal head section and the nonmetal belly section of the main body are assembled with each other.

Please refer to FIGS. 18 and 19. The phantom lines of FIG. 18 show that the main body 100 is assembled with the switch component 90 (or wire connection terminal). In this embodiment, in accordance with the practical use requirement, the first wall 11 of the metal head section 10 has an area larger than the above embodiment so that more figure (character) sections 45 can be arranged, printed or stamped on the first wall 11 of the metal head section 10.

It should be noted that the shaft hole 30 of the metal head section 10 in the form of a thin sheet structure can be directly pressed into various geometrical configurations. For example, FIGS. 18 and 19 show that two (square) shaft holes are respectively connected with two sides of the (circular) shaft hole 30. Therefore, the shaft hole 30 also can be made with a geometrical configuration such as square, rectangular, triangular, polygonal configuration, etc.

Figure 20:
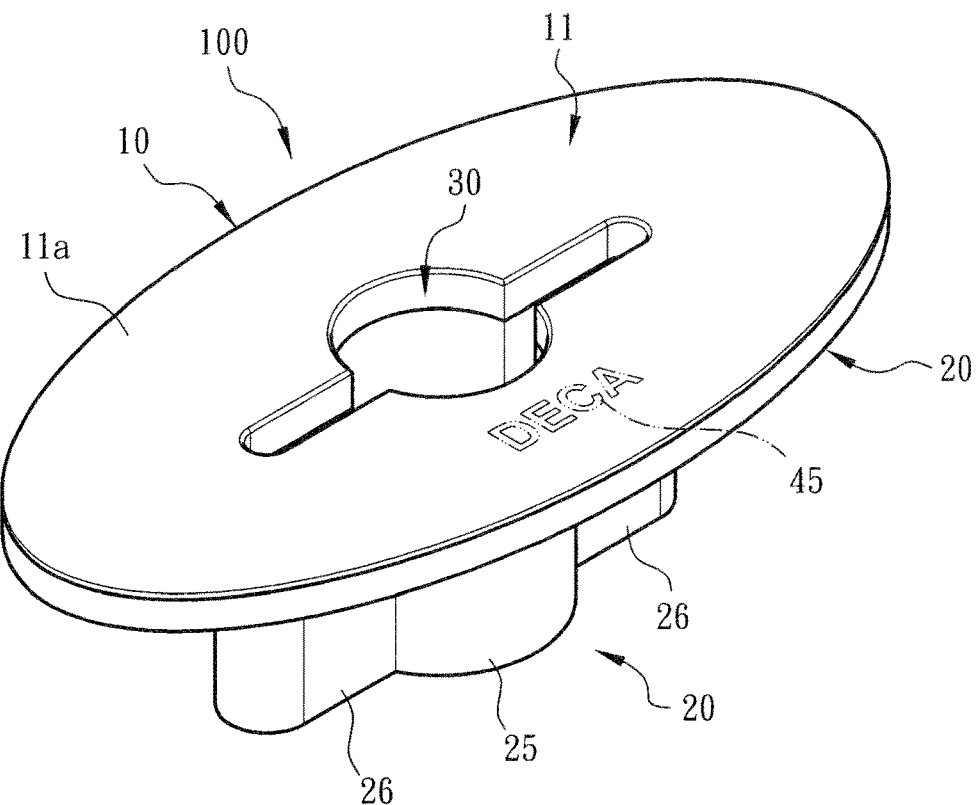
FIG. 20 is a perspective view of a modified embodiment of the present invention, showing the structures of the metal head section and the nonmetal belly section of the main body.
Figure 21:
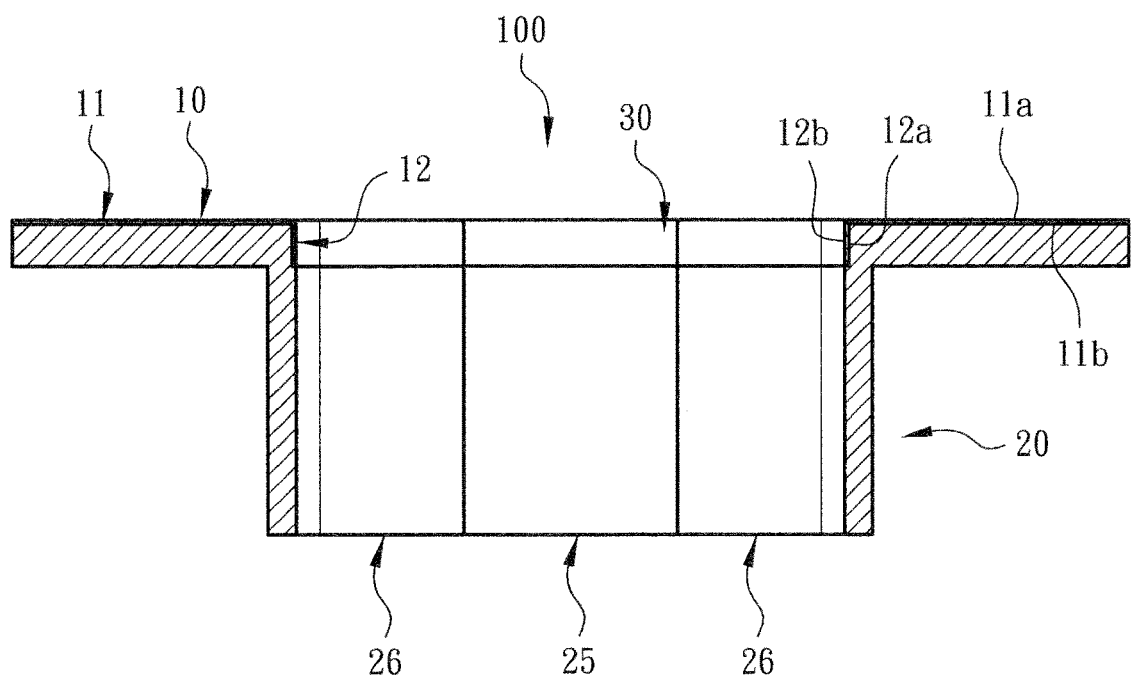
FIG. 21 is a sectional view according to FIG. 20, showing that the metal head section and the nonmetal belly section of the main body are assembled with each other.

Please refer to FIGS. 20 and 21, which show a modified embodiment of the present invention. In this embodiment, two (elongated) holes are respectively connected with two sides of the (circular) shaft hole 30 of the metal head section 10. In addition, according to the practical use requirement (and corresponding to the structure of the shaft hole 30 and for assembling with different forms of switch component or light source component), the nonmetal belly section 20 has a (circular or arched) main section 25 and two (elongated) wing sections 26 integrally connected with two sides of the main section 25.

To speak representatively, in the condition that the structure is simplified and the manufacturing is facilitated, in comparison with the conventional switch device, the switch seat body structure of the present invention has the following advantages:

1. The main body 100 and the relevant component structures have been redesigned in use and operation form to be different from the conventional switch device. For example, the main body 10 includes a complex structure of metal head section 10 in the form of a thin sheet structure and a nonmetal belly section 20. The first wall 11, the second wall 12 and/or the subsidiary wall 13 of the metal head section 10 together define the space 35. The nonmetal belly section 20 fills the space 35 to entirely connect with the first wall 11, the second wall 12 and/or the subsidiary wall 13 so as to facilitate the manufacturing and processing. This obviously improves the shortcomings of the conventional switch device that the seat body is entirely made of metal material or the entire metal column body is lathed and milled so that the manufacturing/processing is troublesome, time-consuming and material-wasting and the cost is higher. Moreover, the structural design of the present invention obviously can reduce the waste metal material to solve the environmental pollution problem.

2. The second wall 12 of the main body 100 or the metal head section 11 is inclined from the axis x (and/or a closure body 31 is disposed in the shaft hole 30). Such structural form makes the nonmetal belly section 20 enclose the outer surface 12a and inner surface 12b of the second wall 12 to achieve secure connection effect. In addition, the metal head section 10 is in the form of a thin sheet structure so that it is easy to press and shape the metal head section 10 into various structural forms. Therefore, in accordance with the practical use situation, an operator can selectively use different structural form of main body 100 to assemble with different types of switch components 90, light source components 95 or wire connection terminals) to widen the application range. Also, the first wall 11 enables the figure character section 45 to be easily printed on thereon to achieve decoration/indication effect.

In conclusion, the switch seat body structure of the present invention is effective and different from the conventional switch device in space form. The switch seat body assembling structure of the present invention is inventive, greatly advanced and advantageous over the conventional switch device.

The above embodiments are only used to illustrate the present invention, not intended to limit the scope thereof. Many modifications of the above embodiments can be made without departing from the spirit of the present invention.

What is claimed is:

1. A switch seat body structure comprising:
a main body including a metal head section in the form of a thin sheet structure and a nonmetal belly section, the main body being defined with an axis, the metal head section having a first wall, a second wall connected with the first wall, and a shaft hole positioned on the axis and pressed into a geometrical configuration, the first wall being normal to the axis or inclined from the axis, the second wall being parallel to the axis or inclined from the axis, whereby the first and second walls contain an angle, which is an acute angle, a right angle or an obtuse angle, each of the first and second walls having an outer surface and an inner surface opposite the outer surface, the inner surface of the second wall facing the shaft hole, the first and second walls together defining therebetween a space, the nonmetal belly section being formed with an internal space, the nonmetal belly section filling the space to connect with at least a portion of each of the inner surface of the first wall and the outer surface of the second wall, whereby the metal head section and the nonmetal belly section are connected as an integrated body structure,
wherein the second wall is connected with the first wall at one end of the first wall, an other end of the first wall being formed and being connected with a subsidiary wall, the subsidiary wall being formed in such a manner that the other end of the first wall is bent toward the lower side to extend in a direction in parallel to or inclined from the axis, the subsidiary wall having an outer surface and an inner surface, the first wall, the second wall and the subsidiary wall together defining the space, the nonmetal belly section being entirely connected with the inner surface of the subsidiary wall.

2. The switch seat body structure as claimed in claim 1, wherein the internal space of the nonmetal belly section is configured to cooperate with the shaft hole to mount one of a switch component, a light source component, and a wire connection terminal, the nonmetal belly section downward extending in a direction in parallel to the axis, a shoulder section being disposed in the internal space of the nonmetal belly section.

3. The switch seat body structure as claimed in claim 2, wherein a light source component is mounted in the main body, a closure body is disposed in the shaft hole of the metal head section, the closure body being a structure with a U-shaped cross section, the closure body including a base section on the upper side and a wall section perpendicularly connected with the base section, the wall section cooperating with the nonmetal belly section to respectively compress the inner surface and outer surface of the second wall of the metal head section, whereby the nonmetal belly section encloses the second wall, at least one of the base section and the wall section of the closure body being transparent, whereby the light source component can emit light through the closure body, the first wall of the metal head section permitting a figure section to be arranged thereon.

4. The switch seat body structure as claimed in claim 3, wherein the closure body and the nonmetal belly section are integrally formed, the light source component having an insertion section in the form of a protrusion structure or a hole structure, the nonmetal belly section being formed with a restriction section in the form of a hole structure or a protrusion structure for correspondingly assembling with the insertion section of the light source component.

5. The switch seat body structure as claimed in claim 2, wherein one end of the first wall is connected with the second wall, and an other end of the first wall opposite the one end is formed and connected with a subsidiary wall, the subsidiary wall being formed in such a manner that the other end of the first wall is bent toward the lower side to extend in a direction in parallel to or inclined from the axis, the subsidiary wall having an outer surface and an inner surface, the first wall, the second wall, and the subsidiary wall together defining the space, the nonmetal belly section being entirely connected with the inner surface of the subsidiary wall.

6. The switch seat body structure as claimed in claim 3, wherein the other end of the first wall is formed and connected with a subsidiary wall, the subsidiary wall being formed in such a manner that the other end of the first wall is bent toward the lower side to extend in a direction in parallel to or inclined from the axis x, the subsidiary wall having an outer surface and an inner surface, the first wall, the second wall and the subsidiary wall together defining the space, the nonmetal belly section being entirely connected with the inner surface of the subsidiary wall.

7. The switch seat body structure as claimed in claim 1, wherein the second wall of the metal head section obliquely extends to the outer side or inner side of the main body in a direction inclined from the axis x, whereby the first wall and the second wall contain an angle, which is an acute angle or an obtuse angle, a section of the nonmetal belly section cooperating with the nonmetal belly section to respectively compress the inner surface and outer surface of the second wall of the metal head section, whereby the nonmetal belly section encloses at least a part of the second wall.

8. The switch seat body structure as claimed in claim 2, wherein the second wall of the metal head section obliquely extends to the outer side or inner side of the main body in a direction inclined from the axis x, whereby the first wall and the second wall contain an angle, which is an acute angle or an obtuse angle, a section of the nonmetal belly section cooperating with the nonmetal belly section to respectively compress the inner surface and outer surface of the second wall of the metal head section, whereby the nonmetal belly section encloses at least a part of the second wall.

9. The switch seat body structure as claimed in claim 3, wherein the second wall of the metal head section obliquely extends to the outer side or inner side of the main body in a direction inclined from the axis x, whereby the first wall and the second wall contain an angle, which is an acute angle or an obtuse angle, a section of the nonmetal belly section cooperating with the nonmetal belly section to respectively compress the inner surface and outer surface of the second wall of the metal head section, whereby the nonmetal belly section encloses at least a part of the second wall.

10. The switch seat body structure as claimed in claim 5, wherein the second wall of the metal head section obliquely extends to the outer side or inner side of the main body in a direction inclined from the axis x, whereby the first wall and the second wall contain an angle, which is an acute angle or an obtuse angle, a section of the nonmetal belly section cooperating with the nonmetal belly section to respectively compress the inner surface and outer surface of the second wall of the metal head section, whereby the nonmetal belly section encloses at least a part of the second wall.

11. The switch seat body structure as claimed in claim 6, wherein the second wall of the metal head section obliquely extends to the outer side or inner side of the main body in a direction inclined from the axis x, whereby the first wall and the second wall contain an angle, which is an acute angle or an obtuse angle, a section of the nonmetal belly section cooperating with the nonmetal belly section to respectively compress the inner surface and outer surface of the second wall of the metal head section, whereby the nonmetal belly section encloses at least a part of the second wall.

12. The switch seat body structure as claimed in claim 1, wherein the first wall of the metal head section extends in a direction inclined from the axis x and has an inclined section, the other end of the inclined section extending in a direction normal to the axis x to form a subsidiary wall.

13. The switch seat body structure as claimed in claim 2, wherein the first wall of the metal head section extends in a direction inclined from the axis x and has an inclined section, the other end of the inclined section extending in a direction normal to the axis x to form a subsidiary wall.

14. The switch seat body structure as claimed in claim 3, wherein the first wall of the metal head section extends in a direction inclined from the axis x and has an inclined section, the other end of the inclined section extending in a direction normal to the axis x to form a subsidiary wall.

15. The switch seat body structure as claimed in claim 7, wherein the first wall of the metal head section extends in a direction inclined from the axis x and has an inclined section, the other end of the inclined section extending in a direction normal to the axis x to form a subsidiary wall.

16. The switch seat body structure as claimed in claim 12, wherein the nonmetal belly section is a column-shaped body structure with a thread on the surface, the main body being assembled with the substrate, whereby the subsidiary wall cooperates with the nonmetal belly section to press and connect with the substrate and the entire subsidiary wall presses and connects with the substrate.

17. The switch seat body structure as claimed in claim 1, wherein the first wall of the metal head section extends in a direction normal to the axis x, the other end of the first wall extending to outer side of the main body to form the subsidiary wall inclined from the axis x, whereby the subsidiary wall has a head section, a tail end of the head section of the subsidiary wall extending to outer side of the main body in a direction normal to the axis x to form a connection section, the connection section further extending to outer side of the main body in a direction inclined from the axis x to form a tail section, whereby the first wall and the subsidiary wall of the metal head section are formed with at least two-stage structure, the first wall and the head section of the subsidiary wall containing an angle, which is an acute angle, a right angle or an obtuse angle, the head section of the subsidiary wall and the connection section containing an angle, which is an acute angle, a right angle or an obtuse angle, the connection section and the tail section containing an angle, which is an acute angle, a right angle or an obtuse angle.

18. The switch seat body structure as claimed in claim 2, wherein the first wall of the metal head section extends in a direction normal to the axis x, the other end of the first wall extending to outer side of the main body to form the subsidiary wall inclined from the axis x, whereby the subsidiary wall has a head section, a tail end of the head section of the subsidiary wall extending to outer side of the main body in a direction normal to the axis x to form a connection section, the connection section further extending to outer side of the main body in a direction inclined from the axis x to form a tail section, whereby the first wall and the subsidiary wall of the metal head section are formed with at least two-stage structure, the first wall and the head section of the subsidiary wall containing an angle, which is an acute angle, a right angle or an obtuse angle, the head section of the subsidiary wall and the connection section containing an angle, which is an acute angle, a right angle or an obtuse angle, the connection section and the tail section containing an angle, which is an acute angle, a right angle or an obtuse angle.

19. The switch seat body structure as claimed in claim 3, wherein the first wall of the metal head section extends in a direction normal to the axis x, the other end of the first wall extending to outer side of the main body to form the subsidiary wall inclined from the axis x, whereby the subsidiary wall has a head section, a tail end of the head section of the subsidiary wall extending to outer side of the main body in a direction normal to the axis x to form a connection section, the connection section further extending to outer side of the main body in a direction inclined from the axis x to form a tail section, whereby the first wall and the subsidiary wall of the metal head section are formed with at least two-stage structure, the first wall and the head section of the subsidiary wall containing an angle, which is an acute angle, a right angle or an obtuse angle, the head section of the subsidiary wall and the connection section containing an angle, which is an acute angle, a right angle or an obtuse angle, the connection section and the tail section containing an angle, which is an acute angle, a right angle or an obtuse angle.

20. The switch seat body structure as claimed in claim 9, wherein the first wall of the metal head section extends in a direction normal to the axis x, the other end of the first wall extending to outer side of the main body to form the subsidiary wall inclined from the axis x, whereby the subsidiary wall has a head section, a tail end of the head section of the subsidiary wall extending to outer side of the main body in a direction normal to the axis x to form a connection section, the connection section further extending to outer side of the main body in a direction inclined from the axis x to form a tail section, whereby the first wall and the subsidiary wall of the metal head section are formed with at least two-stage structure, the first wall and the head section of the subsidiary wall containing an angle, which is an acute angle, a right angle or an obtuse angle, the head section of the subsidiary wall and the connection section containing an angle, which is an acute angle, a right angle or an obtuse angle, the connection section and the tail section containing an angle, which is an acute angle, a right angle or an obtuse angle.

21. The switch seat body structure as claimed in claim 17, wherein the nonmetal belly section is a column-shaped body structure with a thread on the surface, the main body being assembled with the substrate, whereby the subsidiary wall cooperates with the nonmetal belly section to press and connect with the substrate and the entire subsidiary wall presses and connects with the substrate.

22. The switch seat body structure as claimed in claim 1, wherein the second wall of the metal head section is formed with at least one assembling section, the assembling section integrally protruding from the lower section of the second wall in a direction in parallel to the axis x, the assembling section including a base section coplanar with the second wall and a subsidiary section perpendicularly bent from the base section to protrude in a direction to outer side of the main body, whereby the assembling section has the form of an L-shaped plate body structure.

23. The switch seat body structure as claimed in claim 2, wherein the second wall of the metal head section is formed with at least one assembling section, the assembling section integrally protruding from the lower section of the second wall in a direction in parallel to the axis x, the assembling section including a base section coplanar with the second wall and a subsidiary section perpendicularly bent from the base section to protrude in a direction to outer side of the main body, whereby the assembling section has the form of an L-shaped plate body structure.

24. The switch seat body structure as claimed in claim 3, wherein the second wall of the metal head section is formed with at least one assembling section, the assembling section integrally protruding from the lower section of the second wall in a direction in parallel to the axis x, the assembling section including a base section coplanar with the second wall and a subsidiary section perpendicularly bent from the base section to protrude in a direction to outer side of the main body, whereby the assembling section has the form of an L-shaped plate body structure.

25. The switch seat body structure as claimed in claim 1, wherein the second wall of the metal head section is formed with at least one assembling section, the nonmetal belly section being formed with at least one insertion section, the insertion section protruding in a direction to the axis x or being recessed in a direction away from the axis x, the assembling section having the form of a hole structure or a protrusion structure, whereby when the nonmetal belly section is assembled with the metal head section, the insertion sections are inserted with the assembling sections.

26. The switch seat body structure as claimed in claim 1, wherein the geometrical configuration of the shaft hole is selected from a group consisting of a circular shape, an elliptic shape, a polygonal shape and an irregular shape.

27. The switch seat body structure as claimed in claim 1, wherein the nonmetal belly section has an arched main section and two elongated wing sections integrally connected with two sides of the main section.

28. The switch seat body structure as claimed in claim 8, wherein the first wall of the metal head section extends in a direction normal to the axis x, the other end of the first wall extending to outer side of the main body to form the subsidiary wall inclined from the axis x, whereby the subsidiary wall has a head section, a tail end of the head section of the subsidiary wall extending to outer side of the main body in a direction normal to the axis x to form a connection section, the connection section further extending to outer side of the main body in a direction inclined from the axis x to form a tail section, whereby the first wall and the subsidiary wall of the metal head section are formed with at least two-stage structure, the first wall and the head section of the subsidiary wall containing an angle, which is an acute angle, a right angle or an obtuse angle, the head section of the subsidiary wall and the connection section containing an angle, which is an acute angle, a right angle or an obtuse angle, the connection section and the tail section containing an angle, which is an acute angle, a right angle or an obtuse angle.

29. A switch seat body structure comprising:
   a main body including a metal head section in the form of a thin sheet structure and a nonmetal belly section, the main body being defined with an axis, the metal head section having a first wall, a second wall connected with the first wall, and a shaft hole positioned on the axis and pressed into a geometrical configuration, the first wall being normal to the axis or inclined from the axis, the second wall being parallel to the axis or inclined from the axis, whereby the first and second walls contain an angle, which is an acute angle, a right angle or an obtuse angle, each of the first and second walls having an outer surface and an inner surface, the first and second walls together defining therebetween a space, the nonmetal belly section being formed with an internal space, the nonmetal belly section filling the space to connect with at least at least a portion of the inner surface of the first wall and the outer surface of the second wall, whereby the metal head section and the nonmetal belly section are connected as an integrated body structure,
   wherein the internal space of the nonmetal belly section is configured to cooperate with the shaft hole to mount one of a switch component, a light source component, and a wire connection terminal, the nonmetal belly section downward extending in a direction in parallel to the axis, a shoulder section being disposed in the internal space of the nonmetal belly section, and
   wherein a switch component is mounted in the main body, the switch component having an insertion section in the form of a protrusion structure or a hole structure, the nonmetal belly section being formed with a restriction section in the form of a hole structure or a protrusion structure for correspondingly assembling with the insertion section of the switch component, the first wall of the metal head section permitting a figure section to be arranged thereon.

30. The switch seat body structure as claimed in claim 29, wherein one end of the first wall is connected with the second wall, and an other end of the first wall opposite the one end is formed and connected with a subsidiary wall, the subsidiary wall being formed in such a manner that the other end of the first wall is bent toward the lower side to extend in a direction in parallel to or inclined from the axis, the subsidiary wall having an outer surface and an inner surface, the first wall, the second wall, and the subsidiary wall together defining the space, the nonmetal belly section being entirely connected with the inner surface of the subsidiary wall.

31. The switch seat body structure as claimed in claim 29, wherein the second wall of the metal head section obliquely extends to the outer side or inner side of the main body in a direction inclined from the axis x, whereby the first wall and the second wall contain an angle, which is an acute angle or an obtuse angle, a section of the nonmetal belly section cooperating with the nonmetal belly section to respectively compress the inner surface and outer surface of the second wall of the metal head section, whereby the nonmetal belly section encloses at least a part of the second wall.

32. The switch seat body structure as claimed in claim 30, wherein the second wall of the metal head section obliquely extends to the outer side or inner side of the main body in a direction inclined from the axis x, whereby the first wall and the second wall contain an angle, which is an acute angle or an obtuse angle, a section of the nonmetal belly section cooperating with the nonmetal belly section to respectively compress the inner surface and outer surface of the second wall of the metal head section, whereby the nonmetal belly section encloses at least a part of the second wall.

33. The switch seat body structure as claimed in claim 29, wherein the first wall of the metal head section extends in a direction inclined from the axis x and has an inclined section, the other end of the inclined section extending in a direction normal to the axis x to form a subsidiary wall.

34. The switch seat body structure as claimed in claim 29, wherein the first wall of the metal head section extends in a direction normal to the axis x, the other end of the first wall extending to outer side of the main body to form the subsidiary wall inclined from the axis x, whereby the subsidiary wall has a head section, a tail end of the head section of the subsidiary wall extending to outer side of the main body in a direction normal to the axis x to form a connection section, the connection section further extending to outer side of the main body in a direction inclined from the axis x to form a tail section, whereby the first wall and the subsidiary wall of the metal head section are formed with at least two-stage structure, the first wall and the head section of the subsidiary wall containing an angle, which is an acute angle, a right angle or an obtuse angle, the head section of the subsidiary wall and the connection section containing an angle, which is an acute angle, a right angle or an obtuse angle, the connection section and the tail section containing an angle, which is an acute angle, a right angle or an obtuse angle.

35. The switch seat body structure as claimed in claim 31, wherein the first wall of the metal head section extends in a direction normal to the axis x, the other end of the first wall extending to outer side of the main body to form the subsidiary wall inclined from the axis x, whereby the subsidiary wall has a head section, a tail end of the head section of the subsidiary wall extending to outer side of the main body in a direction normal to the axis x to form a connection section, the connection section further extending to outer side of the main body in a direction inclined from the axis x to form a tail section, whereby the first wall and the subsidiary wall of the metal head section are formed with at least two-stage structure, the first wall and the head section of the subsidiary wall containing an angle, which is an acute angle, a right angle or an obtuse angle, the head section of the subsidiary wall and the connection section containing an angle, which is an acute angle, a right angle or an obtuse angle, the connection section and the tail section containing an angle, which is an acute angle, a right angle or an obtuse angle.

36. The switch seat body structure as claimed in claim 29, wherein the second wall of the metal head section is formed with at least one assembling section, the assembling section integrally protruding from the lower section of the second wall in a direction in parallel to the axis x, the assembling section including a base section coplanar with the second wall and a subsidiary section perpendicularly bent from the base section to protrude in a direction to outer side of the main body, whereby the assembling section has the form of an L-shaped plate body structure.

37. A switch seat body structure comprising:
    a main body including a metal head section in the form of a thin sheet structure and a nonmetal belly section, the main body being defined with an axis, the metal head section having a first wall, a second wall connected with the first wall at one end thereof, and a shaft hole positioned on the axis and pressed into a geometrical configuration, the first wall being normal to the axis or inclined from the axis, the second wall being parallel to the axis or inclined from the axis, whereby the first and second walls contain an angle, which is an acute angle, a right angle or an obtuse angle, each of the first and second walls having an outer surface and an inner surface, the first and second walls together defining therebetween a space, the nonmetal belly section being formed with an internal space, the nonmetal belly section filling the space to connect with at least at least a portion of the inner surface of the first wall and the outer surface of the second wall, whereby the metal head section and the nonmetal belly section are connected as an integrated body structure,
    wherein an other end of the first wall opposite the one end is formed and connected with a subsidiary wall, the subsidiary wall being formed in such a manner that the other end of the first wall is bent toward the lower side to extend in a direction in parallel to or inclined from the axis, the subsidiary wall having an outer surface and an inner surface, the first wall, the second wall, and the subsidiary wall together defining the space, the nonmetal belly section being entirely connected with the inner surface of the subsidiary wall.

38. The switch seat body structure as claimed in claim 37, wherein the nonmetal belly section is a column-shaped body structure with a thread on a surface thereof, the main body being configured to be assembled with a substrate, whereby the subsidiary wall cooperates with the nonmetal belly section to press against and connect with the substrate.

39. The switch seat body structure as claimed in claim 37, wherein the second wall of the metal head section obliquely extends to the outer side or inner side of the main body in a direction inclined from the axis x, whereby the first wall and the second wall contain an angle, which is an acute angle or an obtuse angle, a section of the nonmetal belly section cooperating with the nonmetal belly section to respectively compress the inner surface and outer surface of the second wall of the metal head section, whereby the nonmetal belly section encloses at least a part of the second wall.

40. The switch seat body structure as claimed in claim 38, wherein the second wall of the metal head section obliquely extends to the outer side or inner side of the main body in a direction inclined from the axis x, whereby the first wall and the second wall contain an angle, which is an acute angle or an obtuse angle, a section of the nonmetal belly section cooperating with the nonmetal belly section to respectively compress the inner surface and outer surface of the second wall of the metal head section, whereby the nonmetal belly section encloses at least a part of the second wall.

41. The switch seat body structure as claimed in claim 37, wherein the second wall of the metal head section is formed with at least one assembling section, the assembling section integrally protruding from the lower section of the second wall in a direction in parallel to the axis x, the assembling section including a base section coplanar with the second wall and a subsidiary section perpendicularly bent from the base section to protrude in a direction to outer side of the main body, whereby the assembling section has the form of an L-shaped plate body structure.

42. The switch seat body structure as claimed in claim 37, wherein the second wall of the metal head section is formed with at least one assembling section, the nonmetal belly section being formed with at least one insertion section, the insertion section protruding in a direction to the axis x or being recessed in a direction away from the axis x, the assembling section having the form of a hole structure or a protrusion structure, whereby when the nonmetal belly section is assembled with the metal head section, the insertion sections are inserted with the assembling sections.

* * * * *